(12) United States Patent
Davis et al.

(10) Patent No.: US 10,251,130 B2
(45) Date of Patent: Apr. 2, 2019

(54) ADAPTIVE AND STATIC KEEP ALIVE MESSAGE DETECTION AND SIMULATION

(71) Applicant: Lenovo (Singapore) Pte. Ltd., Singapore (SG)

(72) Inventors: Mark Charles Davis, Durham, NC (US); Zhengcao Jin, Beijing (CN)

(73) Assignee: Lenovo (Singapore) Pte. Ltd., Singapore (SG)

( * ) Notice: Subject to any disclaimer, the term of this patent is extended or adjusted under 35 U.S.C. 154(b) by 136 days.

(21) Appl. No.: 14/319,023

(22) Filed: Jun. 30, 2014

(65) Prior Publication Data
US 2015/0382302 A1    Dec. 31, 2015

(51) Int. Cl.
*H04W 52/02*    (2009.01)

(52) U.S. Cl.
CPC ..... *H04W 52/0235* (2013.01); *H04W 52/028* (2013.01); *H04W 52/0251* (2013.01); *Y02D 70/00* (2018.01); *Y02D 70/1262* (2018.01); *Y02D 70/142* (2018.01); *Y02D 70/144* (2018.01); *Y02D 70/166* (2018.01)

(58) Field of Classification Search
CPC ........... H04L 29/08612; H04L 67/145; H04W 52/0225; H04W 52/0229; H04W 52/0235; Y02B 60/12; Y02B 60/1207; Y02B 60/121; Y02D 70/14–70/146
See application file for complete search history.

(56) References Cited

U.S. PATENT DOCUMENTS

| 2009/0135751 A1* | 5/2009 | Hodges ................. G06F 1/3209 370/311 |
| 2014/0119195 A1* | 5/2014 | Tofighbakhsh ... H04W 52/0251 370/241 |

\* cited by examiner

*Primary Examiner* — Pao Sinkantarakorn
(74) *Attorney, Agent, or Firm* — Ference & Associates LLC

(57) ABSTRACT

An aspect provides a method, including: in a low power mode of an electronic device, examining, using a network component, an application specific network connection; in response to the examining, using the network component to consult a policy to determine a communication on behalf of the specific application to be sent over the application specific network connection; and sending, using the network component, the communication on behalf of the specific application without waking one or more main processors of the electronic device. Other aspects are described and claimed.

20 Claims, 3 Drawing Sheets

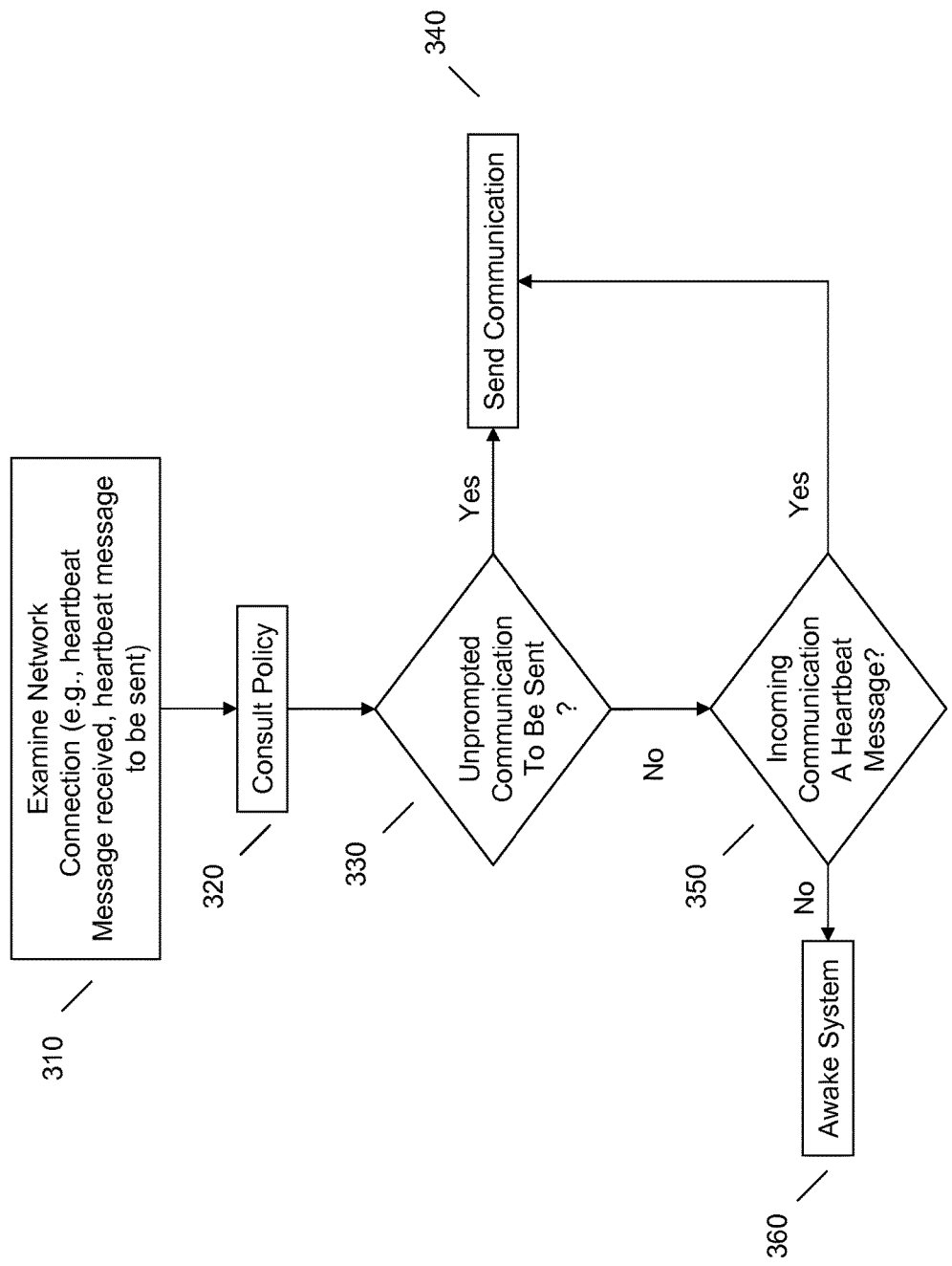

ADAPTIVE AND STATIC KEEP ALIVE MESSAGE DETECTION AND SIMULATION

BACKGROUND

Information handling devices ("devices"), for example cell phones, smart phones, tablet devices, laptop computers and the like have communication capabilities by virtue of a network connection, e.g., a LAN connection, a WAN connection, a telecom network connection, a short range wireless/BLUETOOTH network connection, etc. In many devices, particularly for "mobile" devices (that run on battery power), power management techniques are implemented, some of which affect the device's connection with the network(s). BLUETOOTH is a registered trademark of Bluetooth SIG, Inc. in the United States and other countries.

For example, devices often operate in a full power mode in which a powerful processor ("main CPU") operates and all network connections remain active. Often, power management techniques achieve power savings by letting the main CPU sleep or enter into a reduced activity/power mode, whereby the device does not consume as much power. Such reduced power modes, however, often affect network connectivity of the device. This may have undesirable impacts, e.g., on device applications that require a persistent connection or maintenance of a network connection for operability (in whole or in part). Thus, it is often desirable for the device's system to attempt to maintain the appearance of network connectivity, even in a reduced power mode.

BRIEF SUMMARY

In summary, one aspect provides a method, comprising: in a low power mode of an electronic device, examining, using a network component, an application network connection; in response to the examining, using the network component to consult a policy to determine a communication on behalf of the application to be sent over the application network connection; and sending, using the network component, the communication on behalf of the application without waking one or more main processors of the electronic device.

Another aspect provides an electronic device, comprising: one or more main processors; a network component and a processor; and a memory operatively coupled to the network component, the processor, and the one or more main processors that stores instructions executable by the processor, the instructions being executable by the processor to: in a low power mode of the device, examine an application network connection; in response to examining the application network connection, use the network component to consult a policy to determine a communication on behalf of the application to be sent over the application network connection; and send, using the network component, the communication on behalf of the application without waking the one or more main processors of the electronic device.

A further aspect provides a computer program product, comprising: a storage device that stores instructions executable by a processor, the instructions comprising: instructions that, in a low power mode of the device, examine an application network connection; instructions that, in response to examining the application network connection, use the network component to consult a policy to determine a communication on behalf of the application to be sent over the application network connection; and instructions that send, using the network component, the communication on behalf of the application without waking the one or more main processors of the electronic device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3 illustrates an example method of providing adaptive and static keep-alive message detection and simulation.

DETAILED DESCRIPTION

Figure 1:
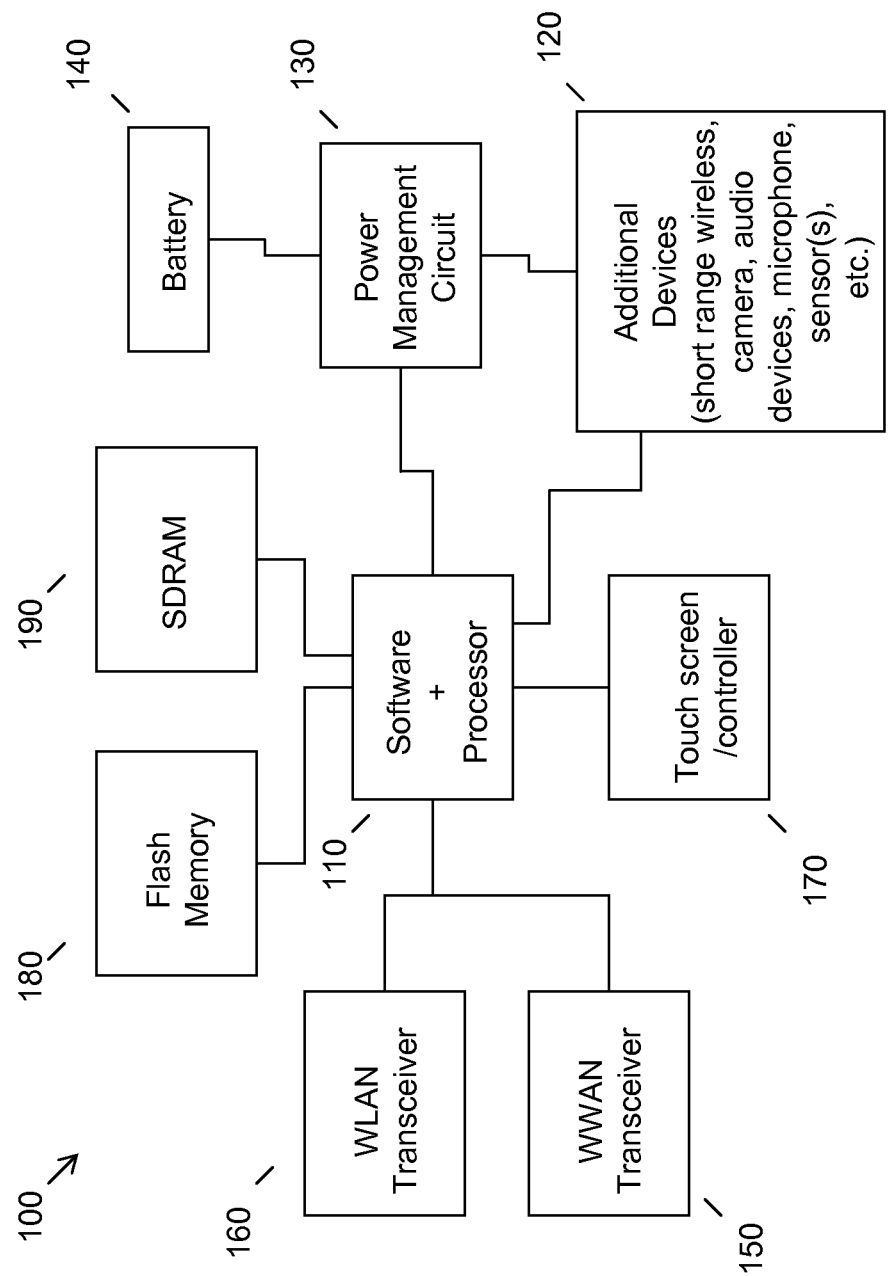
FIG. 1 illustrates an example information handling device.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

It is often desirable to maintain a network connection because, among other things, overhead is added to system processing to establish (or re-establish) a network connection. This leads to additional processing and time delay, even for relatively straight forward applications (e.g., an Internet browser application). For example, on resume (e.g., turning on a smart phone screen, awaking a tablet device, etc.) there is a delay during which the device establishes usable network connections and this affects various applications that require network derived data or content.

As it is often desirable for the device's system to attempt to maintain the appearance of network connectivity, even in a reduced power mode, prior attempts have been made to push network connectivity management to reduced power ("light weight") processors, allowing a main CPU to enter into a reduced power mode. For example, in 4G LTE telecom networked devices, a communications chip often includes a processor or circuit logic to manage the base band.

In order to verify that the network connection is still valid, "keep-alive" or "heartbeat" messages are received/sent periodically. This can be a disadvantage if a complex system has to keep running to answer the heartbeat and must expend relatively high power. If instead a lower power network processor can reply to the heartbeat messages, then have the system wake up for other types of traffic, both the advantages of continuous connection and power savings from sleep mode can be enjoyed.

The concept of connected standby is included in WINDOWS 8 operating system (WIN RT). This keeps Wi-Fi connections alive while allowing the main system to sleep. In this approach, when traffic for the machine is detected, the network adapter wakes up the rest of the system to process the network packets. This only partially addresses the problem, however, as most heartbeat messages are not handled because the network adapter does not know about application specific heartbeats (application level communications), what socket connections should be kept up, etc. In this context, the level II and level III connections are permitted to remain active, but not the application level connections. Thus, when the system is awoken (WINDOWS OS is awoken), application specific sockets must be re-established before the application may proceed. As a result, the main system is repeatedly awoken or messages are not handled.

Accordingly, an embodiment provides intelligence, e.g., in the network adapter or other communication component(s) (e.g., ETHERNET, BLUETOOTH, Wi-Fi, and LTE components), to handle routine traffic by allowing keep-alive and heartbeat message identification/processing to be specific to the application level. The logic for handing such tasks at the network component level may be predetermined (e.g., hard coded into the logic for known messaging schemes), obtained from a reliable source (e.g., downloaded from the main system) or dynamically managed (e.g., by observing message behavior and adapting according to predetermined rules). Thus, an embodiment permits a network component, e.g., a network adapter/controller, to send specific data to keep application level connections active while permitting the main system to sleep.

In an example implementation, code is run on a network adapter to examine and intercept, if necessary, traffic for applications running on the main system. Additionally, the main system is able to go to sleep (with "sleep" being used to refer generally to any reduced power mode) while the network adapter remains active. This disjunctive powering of components is already permitted by many systems such, e.g., the connected standby system described above.

If the main system is awake, all network traffic may be relayed to the main system. If the main system is sleeping, the code on the network adapter examines each packet received. The network adapter uses a policy (e.g., stored in a table) to determine if a received packet is a heartbeat packet (or otherwise a network maintenance message) and if it is, the policy includes a method to respond to the heartbeat packet. If a packet is not heartbeat packet, then the main system may be awakened and the packet sent to be processed by the application on the main system.

It may also be that heartbeat and keep-alive messages should be sent out proactively from the system. In that case, a policy may also contain timing information (e.g., a time requirement) and perhaps other information to determine the application. For example, an application may notify, out of band, that heartbeat messages are required.

The policy may be populated with identification information and reply methods in a variety of ways. For example, policies may be hard coded for well-known protocols. By way of non-limiting example, the TCP/IP keep-alive function is a standard and thus may be coded into the network adapter logic. Also, policies may be downloaded or retrieved from the main system. By way of example, an application that wants heartbeats to be processed while it is sleeping may provide that information (e.g., on identification and reply method) to the network adapter. Additionally, heartbeat message identification and/or processing may be dynamically managed. For example, heartbeats are period messages that are very short and almost always answered in an identifiable node. Message pairs that meet the requirements or indicate such a recognizable pattern may be analyzed to determine a reply method, with the reply method being compared against a large number of replies to make sure that it is working correctly. If tests are satisfactory, the recognition and method (and perhaps application) may be programmed into the policy. Change in behavior on the main system may be implemented. For example, the system network interfaces may need to be changed or a unique interface may be used that will persist thorough main system sleep.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system design found for example in tablet or other mobile computing platforms. Software and processor(s) are combined in a single unit 110. Internal busses and the like depend on different vendors, but essentially all the peripheral devices (120) may attach to a single unit 110. The circuitry 100 combines the processor, memory control, and I/O controller hub all into a single unit 110. Also, systems 100 of this type do not typically use SATA or PCI or LPC. Common interfaces for example include SDIO and I2C.

There are power management circuits(s) 130, e.g., a battery management unit, BMU, which manage power as supplied for example via a rechargeable battery 140, which may be recharged by a connection to a power source (not shown). In at least one design, a single unit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included, e.g., a microphone, a camera, an orientation sensor included in a 9-axis sensor module, etc. Additional devices may include short range wireless radio(s), such as BLUETOOTH radios, for communicating with other devices over different types of networks, e.g., short range wireless or personal area networks. Near field communication element(s) may also be included as additional network component(s) or device(s) 120. Commonly, system 100 will include a touch screen/controller 170 for data input and display. System 100 also typically includes various memory devices, for example flash memory 180 and SDRAM 190.

Figure 2:
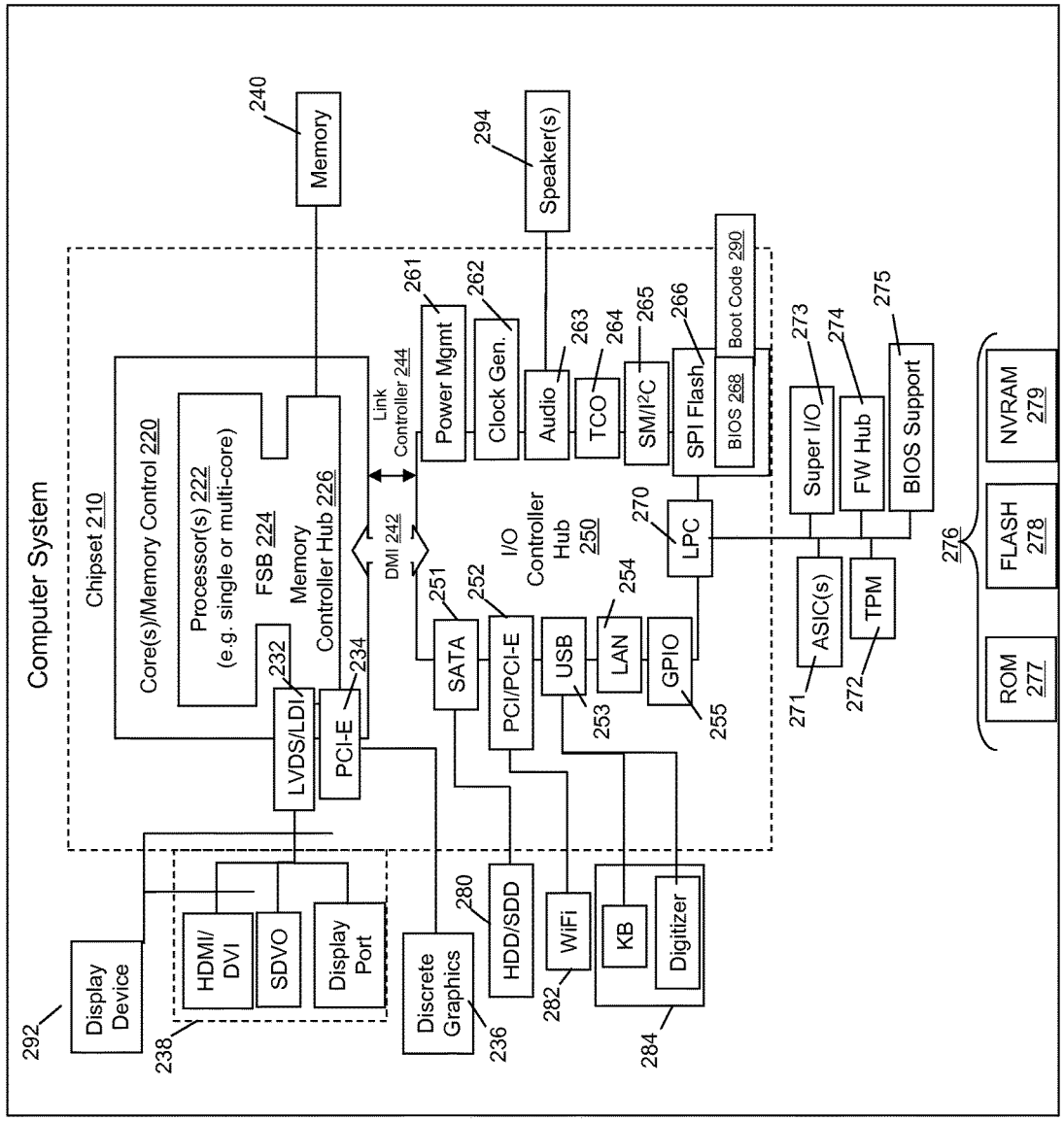
FIG. 2 illustrates another example information handling device.

FIG. 2, for its part, depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a set 210 (a group of integrated circuits that work together) with an architecture that may vary depending on manufacturer (for example, INTEL, AMD, ARM, etc.). INTEL is a registered trademark of Intel Corporation in the United States and other jurisdictions. AMD is a registered trademark of Advanced Micro Devices, Inc. in the United States and other jurisdictions. ARM is a trademark of ARM Holdings plc in various jurisdictions.

The architecture of the set 210 includes a core and memory control group 220 and an I/O controller hub 250 that exchanges information (for example, data, signals, commands, etc.) via a direct management interface (DMI) 242 or a link controller 244. In FIG. 2, the DMI 242 is an interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a unit that supplants the conventional "northbridge" style architecture.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, 280, etc.), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computing devices generally, and/or other portable devices. For example, the circuitry outlined in FIG. 1 may be implemented in a tablet or smart phone embodiment, whereas the circuitry outlined in FIG. 2 may be implemented in a laptop PC embodiment.

As described herein, an embodiment provides a more intelligent filtering of network communication messages such that a main system (e.g., main processor(s)) may remain in a sleep or reduced power mode, yet application specific connections may also be maintained. In an embodiment, and referring generally to FIG. 3, a network component such as a network adapter is provided with logic to implement a policy, whether a predetermined policy is used and/or a policy is retrieved or a policy is dynamic determined, for intelligently managing which network traffic is sent to the main system (and thus wakes the main system) and which network traffic may be locally managed by the network adapter, allowing the main system to remain in a reduced power mode.

In an embodiment, in a low power mode of an electronic device, e.g., one in which a main processor is not active or fully active, an embodiment employs a powered component, e.g., a network adaptor, to examine at 310 an application specific network connection. This examining at 310 may take a variety of forms, as will become more apparent throughout. For example, the examining at 310 may be time based, e.g., time elapsed since last message sent or received. The examining at 310 may be reactive, e.g., a received packet is examined and determined to be a heartbeat packet.

In an example, the examining at 310 may include determining that a predetermined time has elapsed with respect to a particular application's network connection. By way of example, for a standard connection, e.g., a TCP/IP connection of a web browser, the network adapter may examine the connection at 310 to determine that more than a predetermined time has elapsed (e.g., just shy of 45 seconds) since the last network traffic. According to a predetermined policy, e.g., consulted at 320, the network adapter may thus determine that at 45 seconds, the network connection will be lost. Thus, the network adapter may determine at 330 that a communication (e.g., keep alive packet) is to be sent for the application at 330, according to the policy. An unprompted communication may be sent by the local network adapter at 340 without receipt of a heartbeat message and without waking the main system.

By way of further example, in response to (or as part of) the examining at 310, the network component may consult a policy at 320 to determine that a communication on behalf of the specific application is to be sent over the application specific network connection at 350. For example, the examining at 310 may reveal that a network packet has been received over a network connection. At 350, further processing by the network adapter may provide that this is a heartbeat packed for a particular application. Thus, the policy consulted at 320 may include application specific information regarding its heartbeat packets such that the network adapter may identify a received network packet for the application, and determine at 350 an appropriate handling thereof, e.g., that a communication (e.g., response to a received heartbeat packet) is to be sent on behalf of the application.

Therefore, an embodiment may determine at 350 that the incoming packet is a heartbeat message and send a communication out over the network on behalf of the application at 340. Otherwise, e.g., if the received packet(s) found by examining the network connection at 310 are not heartbeat messages, the network adapter may relay these to the main system, i.e., waking the system to handle the network traffic at 360.

Thus, an embodiment handles examination of a network connection locally, e.g., by the network adapter, such that the main system (main CPU) is not awoken, nor is the application specific network connection removed unless so dictated by an active policy control. This permits maintenance of network connections, including application specific connections, by a low power controller without waking the system from a sleep mode. As described herein, this may include receiving heartbeat messages and responding to the same locally. As further described herein, this may also include determining that the network connection will be lost and proactively sending keep-alive messages on behalf of an application, even if not prompted by a received heartbeat message. Again this may be accomplished locally, without need to wake the system.

As described herein, the policy (in part or the whole policy) may be hard coded into the local unit, e.g., network adapter. Alternatively or additionally, an embodiment may retrieve the policy (in part or the whole policy) from another system component, e.g., the operating system or an application. Alternatively or additionally, an embodiment may dynamically adapt the policy (in part or the whole policy) based on learned information over time, including sending test messages and observing/examining network connection behavior.

An embodiment may learn a pattern or characteristic of an application's keep-alive messages in a variety of ways, for example by tracking mistakes such as previously unidentified heartbeat messages that are allowed to wake the system. These may be later identified by observing past system behavior in response to the relaying thereof. This observation may be conducted by the network adapter itself or provided to the network adapter, e.g., by the main system.

An embodiment may also learn a pattern or characteristic by observing or receiving timing thresholds for sending/responding to keep-alive messages, e.g., without active input by the main system. For example, the network adapter may track the pattern or characteristic for a particular type of message that is received or sent for a particular application, etc. This may be accomplished for example by recording or tracking characteristics of application specific network traffic behavior during full system power such that techniques so learned may be applied during sleep or reduced power modes. Again, this learning may be accomplished by another system component and provided to the network adapter, e.g., according to another policy.

Likewise, a network adapter may send test messages or best-guess responses and learn by observing the result of such attempts. For example, given a lack of information for a particular message received for an application, the network adapter may map the context to a similar application and provide a best guess response to the network packet. Depending on the result of this, e.g., network connection maintained/not maintained, the network adapter may update the policy accordingly.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication or short range wireless communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying

What is claimed is:

1. A method, comprising:
in a low power mode of an electronic device, examining, using a network component of the electronic device, a network connection of an application, wherein in the low power mode one or more main processors of the electronic device are in a sleep state and the network component remains active;
in response to the examining, using the network component to consult a policy to determine a heartbeat communication corresponding to and on behalf of the application to be sent over the network connection to maintain the network connection of the application, wherein the policy corresponds to the application and identifies timing information corresponding to the heartbeat communication for the application based on application specific network traffic behavior during full system power;
sending, using the network component, the heartbeat communication per the timing information of the policy on behalf of the application without waking one or more main processors of the electronic device; and
updating the policy based upon a result of the sent heartbeat communication and historical data associated with sent communications.

2. The method of claim 1, further comprising receiving, at the network component of an electronic device, a network packet addressed to the application;
wherein the examining comprises examining the network packet received to determine if the network packet is a heartbeat packet for the application.

3. The method of claim 2, wherein the sending comprises sending a response to the heartbeat packet on behalf of the application without waking one or more main processors of the electronic device.

4. The method of claim 1, wherein the policy is hard coded into the network component with message processing for standardized application communications.

5. The method of claim 1, further comprising receiving the policy from another component of the electronic device.

6. The method of claim 1, further comprising receiving the policy from an application running on the electronic device.

7. The method of claim 1, further comprising dynamically determining the policy.

8. The method of claim 7, wherein the dynamically determining comprises analyzing prior heartbeat messages for an application.

9. The method of claim 8, wherein the analyzing prior heartbeat messages for an application is conducted during full system power for the electronic device.

10. The method of claim 1, wherein the examining an application network connection comprises sending test messages.

11. The method of claim 10, wherein one or more test messages are sent during a low power mode.

12. An electronic device, comprising:
one or more main processors;
a network component operatively coupled to the one or more main processors and having one or more sub-processors; and
a memory operatively coupled to the one or more sub-processors that stores instructions executable by the one or more sub-processors, the instructions being executable by the processor to:
in a low power mode of the device, examine, using a network component of the device, a network connection of an application, wherein in the low power mode one or more main processors of the electronic device are in a sleep state and the network component remains active;
in response to examining the application network connection, use the network component to consult a policy to determine a heartbeat communication corresponding to and on behalf of the application to be sent over the network connection to maintain the network connection of the application, wherein the policy corresponds to the application and identifies timing information corresponding to the heartbeat communication for the application based on application specific network traffic behavior during full system power;
send, using the network component, the heartbeat communication per the timing information of the policy on behalf of the application without waking the one or more main processors of the electronic device; and
update the policy based upon a result of the sent heartbeat communication and historical data associated with sent communications.

13. The electronic device of claim 12, wherein the instructions are further executable by the processor to receive, at the network component, a network packet addressed to the application;
wherein to examine comprises examining the network packet received to determine if the network packet is a heartbeat packet for the application.

14. The electronic device of claim 12, wherein to send comprises sending a response to the heartbeat packet on behalf of the application without waking the one or more main processors of the electronic device.

15. The electronic device of claim 12, wherein the policy is hard coded into the network component with message processing for application level communications.

16. The electronic device of claim 12, wherein the instructions are further executable by the processor to receive the policy from another component of the electronic device.

17. The electronic device of claim 12, wherein the instructions are further executable by the processor to receive the policy from an application running on the electronic device.

18. The electronic device of claim 12, wherein the instructions are further executable by the processor to dynamically determine the policy.

19. The electronic device of claim 18, wherein the policy is dynamically determined by analyzing prior heartbeat messages for an application.

20. A computer program product, comprising:
a storage device that stores instructions executable by a processor, the instructions comprising:
instructions that, in a low power mode of the device, examine, using a network component of the device, a network connection of an application, wherein in the low power mode one or more main processors of the electronic device are in a sleep state and the network component remains active;
instructions that, in response to examining the application network connection, use the network component to consult a policy to determine a heartbeat communication corresponding to and on behalf of the application to be sent over the network connection to maintain the network connection of the application, wherein the policy corresponds to the application and identifies timing information corresponding to the heartbeat communication for the application based on application specific network traffic behavior during full system power;
instructions that send, using the network component, the heartbeat communication on behalf of the application without waking the one or more main processors of the electronic device; and
instructions that update the policy based upon a result of the sent heartbeat communication per the timing information of the policy and historical data associated with sent communications.

\* \* \* \* \*